United States Patent

Komine et al.

[11] Patent Number: 5,936,620
[45] Date of Patent: Aug. 10, 1999

[54] POWER SUPPLY SYSTEM CAPABLE OF REDUCING POWER CONSUMPTION DURING INTERRUPTION OF AN EXTERNAL INPUT SIGNAL GIVEN TO AN OPERATING CIRCUIT

[75] Inventors: Seiji Komine; Hiroshi Kato, both of Osaka, Japan

[73] Assignee: NEC Corporation, Tokyo, Japan

[21] Appl. No.: 08/550,862

[22] Filed: Oct. 31, 1995

[30] Foreign Application Priority Data

Oct. 31, 1994 [JP] Japan .................................. 6-267136

[51] Int. Cl.[6] .................................................. G09G 5/00
[52] U.S. Cl. ........................................ 345/211; 345/212
[58] Field of Search ................................. 345/211, 212, 345/213; 323/327, 244, 246; 364/707, 492; 348/730; 307/31, 38; 365/227, 229

[56] References Cited

U.S. PATENT DOCUMENTS

| | | | |
|---|---|---|---|
| 5,079,410 | 1/1992 | Payne et al. | 307/31 |
| 5,375,245 | 12/1994 | Solhjell et al. | 345/212 |
| 5,616,988 | 4/1997 | Kim | 345/212 |

FOREIGN PATENT DOCUMENTS

| | | | |
|---|---|---|---|
| 0257893 | 10/1989 | Japan | 345/211 |
| WO-A9406072 | 3/1994 | WIPO | |
| WO-A9416379 | 7/1994 | WIPO | |

*Primary Examiner*—Chanh Nguyen
*Attorney, Agent, or Firm*—Sughrue, Mion, Zinn, Macpeak & Seas, PLLC

[57] ABSTRACT

In a system for use in combination with a power source circuit, a holding circuit is operable in response to interruption of an input signal to deenergize the power source circuit and is put into a self-holding state to hold a stop mode of the power source circuit. The self-holding state is released on arrival of the input signal to unlock the stop mode.

2 Claims, 6 Drawing Sheets

5,936,620

POWER SUPPLY SYSTEM CAPABLE OF REDUCING POWER CONSUMPTION DURING INTERRUPTION OF AN EXTERNAL INPUT SIGNAL GIVEN TO AN OPERATING CIRCUIT

BACKGROUND OF THE INVENTION

This invention relates to a power supply system including an operating circuit which is for operating a CRT display unit, a printer unit, and the like and which is turned on and off in response to supply and interruption of electric power and, in particular, to a power control circuit for controlling the electric power supplied to the operating circuit.

Generally, a power supply system of the type described is used to operate peripheral units of an information processing device such as a computer. Among such peripheral units, a CRT display unit, a printer unit, or the like is put into operation in response to an input signal, such as a synchronization signal, a video signal, and a control signal, which is supplied from an external apparatus. When a peripheral unit of the above-mentioned type is used, it is preferable in view of a reduction of power consumption to turn off a power source circuit for the peripheral unit in absence of the input signal and to turn on the power source circuit only in the presence of the input signal.

To this end, the power supply system generally includes not only an input signal source and an operating circuit such as the power source circuit for the peripheral unit but also a power control circuit for turning on and off the operating circuit in response to presence and absence of the input signal.

Such a conventional power control circuit for carrying out the above-mentioned operation comprises a detecting circuit for detecting non-reception of the input signal, and a switching circuit for turning the operating circuit into a stop mode, namely, an off state when the detecting circuit detects non-reception of the input signal. When the input signal is received again, the operating circuit must be recovered. Therefore, the power control circuit is required to additionally comprise a reception detecting circuit for detecting reception of the input signal and an auxiliary power source circuit for supplying electric power to the reception detecting circuit.

In case where the above-mentioned power control circuit is used, the reception detecting circuit must be kept in an active mode by the auxiliary power source circuit even if the input signal is not received. This results in a complicated circuit structure and an increase of power consumption.

SUMMARY OF THE INVENTION

It is therefore an object of this invention to provide a power supply system which is capable of reducing power consumption during interruption of an input signal given to an operating circuit.

It is another object of this invention to provide a power supply system which is capable of quickly recovering an operating circuit into an on state when an input signal is received again.

It is still another object of this invention to provide a power supply system which has a simplified circuit structure.

It is a further object of this invention to provide a power supply system which requires substantially no auxiliary power source circuit.

It is a still further object of this invention to provide a power control circuit which is suitable for the power supply system mentioned above.

According to this invention, there is provided a power control circuit connected between a signal source for producing an input signal and an operating circuit for carrying out a predetermined operation, to put the operating circuit into an active state in response to arrival of the input signal and into an inactive state in response to interruption of the input signal, the power control circuit comprising a detecting circuit for detecting the arrival and the interruption of the input signal, and a holding circuit which puts the operating circuit into the active state on the arrival of the input signal and which is kept in a self-holding state during the interruption of the input signal to put the operating Ocircuit into the inactive state.

According to this invention, there is also provided a power supply system comprising a signal source for producing an input signal, a power control circuit connected to the signal source, and an operating circuit connected to the power control circuit, the power control circuit comprising a detecting circuit for detecting arrival and interruption of the input signal, and a holding circuit which puts the operating circuit into an active state on the arrival of the input signal and which is kept in a self-holding state during the interruption of the input signal to put the operating circuit into an inactive state.

DESCRIPTION OF THE PREFERRED EMBODIMENTS

Description will now be made as regards several preferred embodiments of this invention with reference to the annexed drawing.

Figure 1:
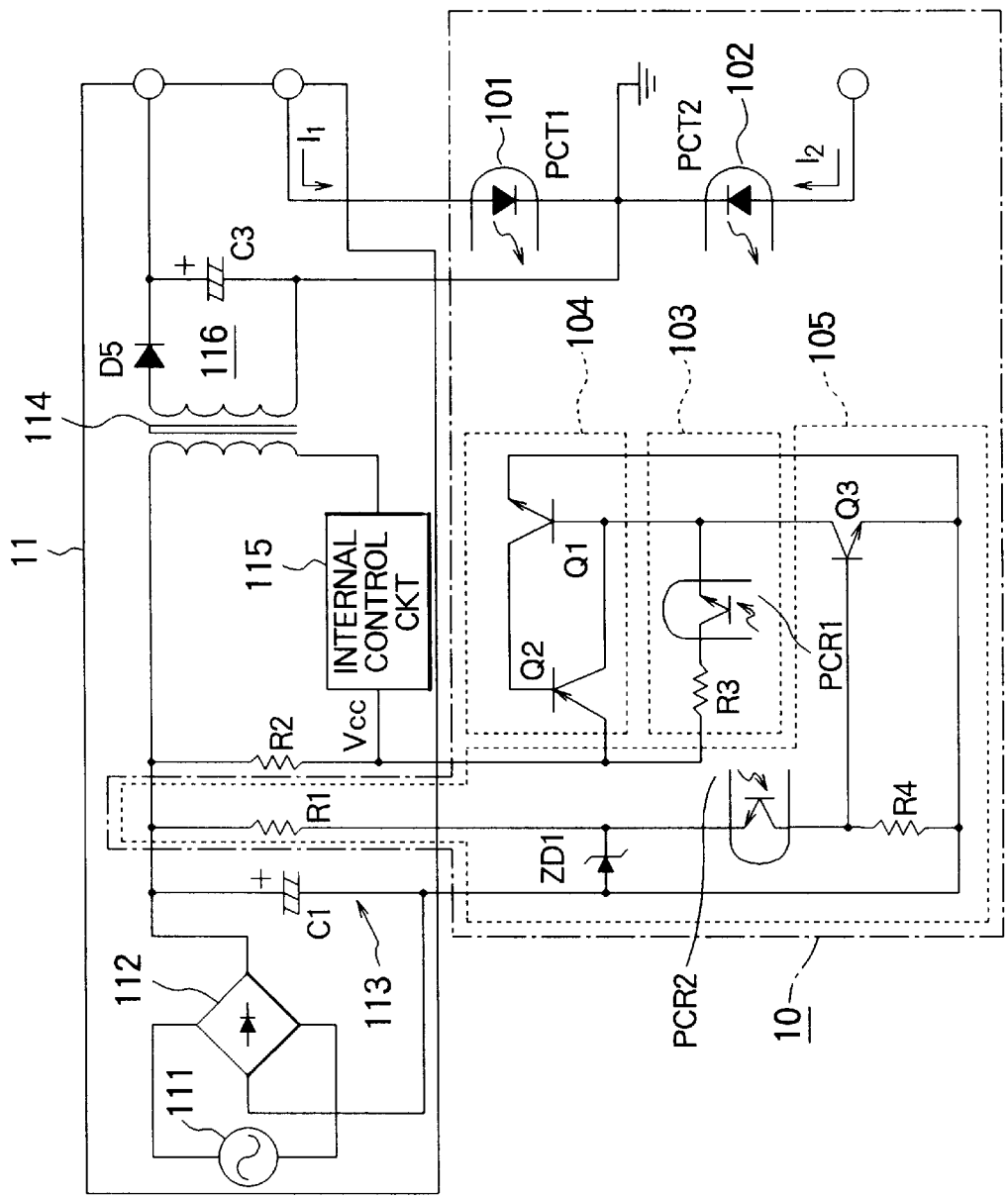
FIG. 1 is a block diagram of a power supply system according to a first embodiment of this invention.

Referring to FIG. 1, a power supply system according to a first embodiment of this invention comprises a power control circuit 10 coupled to a source control circuit 11. The operation of the source control circuit 11 illustrated in the figure is controlled by the power control circuit 10. The source control circuit 11 is connected to a peripheral unit (not shown in FIG. 1) such as a CRT display unit of a computer to supply a power source to the unit.

The source control circuit 11 comprises an a.c. power source 111, a rectifying circuit 112, a smoothing circuit 113, and a switching transformer 114. The switching transformer 114 has a primary side connected to an internal control circuit 115 and a secondary side connected to an output circuit 116. A CRT display unit (not shown) externally connected is turned on and off through the output circuit 116. The smoothing circuit 113 comprises a condenser C1. The output circuit 116 comprises a diode D5 and a condenser C3.

It is assumed here that, in absence of a synchronization signal produced by the computer, the illustrated source control circuit 11 is supplied with an electric current (hereinafter referred to as a first current) I1 from a synchronization signal discriminating circuit (not shown in the figure). On the other hand, when the synchronization signal is produced again by the computer, a second current I2 is caused to flow from an external circuit in a manner to be described later. At any rate, the second current I2 is given in the form of a pulse current which is shorter than the first current I1.

On the other hand, the power control circuit 10 comprises first and second photocouplers 101 and 102 composed of light emitting portions PCT1 and PCT2 and light receiving portions PCR1 and PCR2, respectively. The light emitting portion PCT1 of the first photocoupler 101 is supplied with the first current I1. On the other hand, the light emitting portion PCT2 of the second photocoupler 102 is supplied with the second current I2. The power control circuit 10 comprises an off signal transmitting circuit 103 for transmitting a signal to bring the internal control circuit 115 of the source control circuit 11 into an off state, an off state holding circuit 104 for bringing the internal control circuit 115 into an off state and holding the off state, and a reset circuit 105 for transmitting a signal to bring the internal control circuit into an on state and resetting the off state holding circuit 104.

The off signal transmitting circuit 103 includes the light receiving portion PCR1 of the first photocoupler 101. The light receiving portion PCR1 has a collector connected through a resistor R3 to a source terminal (depicted at Vcc) of the internal control circuit 115. As a result, the off signal transmitting circuit 103 is supplied with a source voltage Vcc, like the internal control circuit 115.

Although the off state holding circuit 104 is practically formed by a thyristor, it is equivalently represented herein by an NPN transistor Q1 and a PNP transistor Q2. As illustrated in the figure, an emitter of the PNP transistor Q2 is supplied with the source voltage Vcc while a collector and a base thereof are connected to a base and a collector of the NPN transistor Q1, respectively. The base of the NPN transistor Q1 is connected to an emitter of the light receiving portion PCR1 of the first photocoupler 101.

The reset circuit 105 comprises a resistor R4 connected in cascade to a serial circuit composed of a resistor R1 and the light receiving portion PCR2 of the second photocoupler 102, an NPN transistor Q3 having a base connected to a common connection point between an emitter of the light receiving portion PCR2 and the resistor R4, and a Zener diode ZD1 having one end connected to the condenser C1. A collector of the NPN transistor Q3 is connected to the base of the NPN transistor Q1 of the off state holding circuit 104.

With reference to FIG. 1, description will now be made as regards the operation of the power control circuit 10 and the source control circuit 11 having the above-mentioned structure.

In a normal mode, the source control circuit 11 rectifies an a.c. voltage of the a.c. power source 111 and converts the a.c. voltage into a d.c. voltage under control of the internal control circuit 115 to supply the d.c. voltage to the peripheral unit of the computer. In this normal mode, it is assumed that the delivery of the synchronization signal from the computer is stopped. In this event, the first current I1 flows to the light emitting portion PCT1 of the first photocoupler 101. As a consequence, the light receiving portion PCR1 of the first photocoupler 101 is turned on and causes an electric current to flow through the resistors R2 and R3. Accordingly, the electric current is also caused to flow to the base of the transistor Q1 of the off state holding circuit 104. Thus, the transistors Q1 and Q2 become conductive so that the source voltage Vcc of the internal control circuit 115 has a low level. As a consequence, the source control circuit 11 stops its operation and is therefore turned off. This state may be called an off mode. The off mode is maintained by a holding current flowing to the transistors Q1 and Q2 via the resistor R2.

Figure 2:
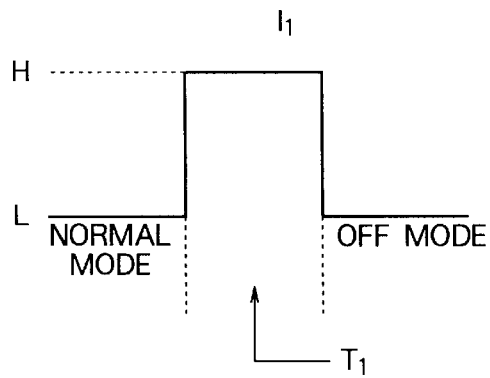
FIG. 2 is a waveform chart for describing the operation of a power control circuit illustrated in FIG. 1.

Referring to FIG. 2 in addition, a relationship between the first current I1 and the mode of operation of the source control circuit 11 is illustrated. The first current I1 is kept at a high level during a transition period from the normal mode to the off mode. The transition period is depicted by T1.

Figure 3:
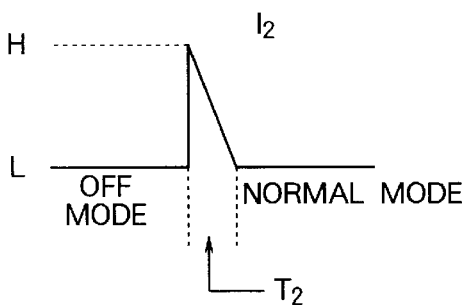
FIG. 3 is a waveform chart for describing another operation of the power control circuit illustrated in FIG. 1.

Referring to FIGS. 1 and 3, description will be made as regards the operation which is carried out on transition from the off mode to the normal mode. In this case, the above-mentioned synchronization signal discriminating circuit is put into an inactive state even if the synchronization signal arrives from the computer. In response to the arrival of the synchronization signal, the instantaneous second current I2 illustrated in FIG. 3 flows from an external circuit, which may be, for example, a circuit exemplified in any one of FIGS. 4, 5, and 6, to the light emitting portion PCT2 of the second photocoupler 102 for a time period T2 shorter than the time period during which the first current I1 flows. As a consequence, the light emitting portion PCT2 emits light to turn the light receiving portion PCR2 into an on state. As a result, an electric current is caused to flow to a base of the NPN transistor Q3 through the resistor R1 and the light receiving portion PCR2 to bring the NPN transistor Q3 into a conductive state. When the transistor Q3 becomes conductive, the transistors Q1 and Q2 are turned into an interrupted state to release the self-holding state which has been maintained by the transistors Q1 and Q2.

By the interruption of the transistors Q1 and Q2, the source voltage Vcc of the internal control circuit 115 is kept at a high level so that the internal control circuit 115 starts its operation. The source control circuit 11 is turned into an active state and is kept in a normal mode.

Thus, in the illustrated power supply system, the off state holding circuit 104 is put into a self-holding state during the off mode. The self-holding state is released by the external circuit such as the circuit illustrated in any one of FIGS. 4, 5, and 6. It is therefore possible to remarkably reduce power consumption during the off mode.

Figure 4:
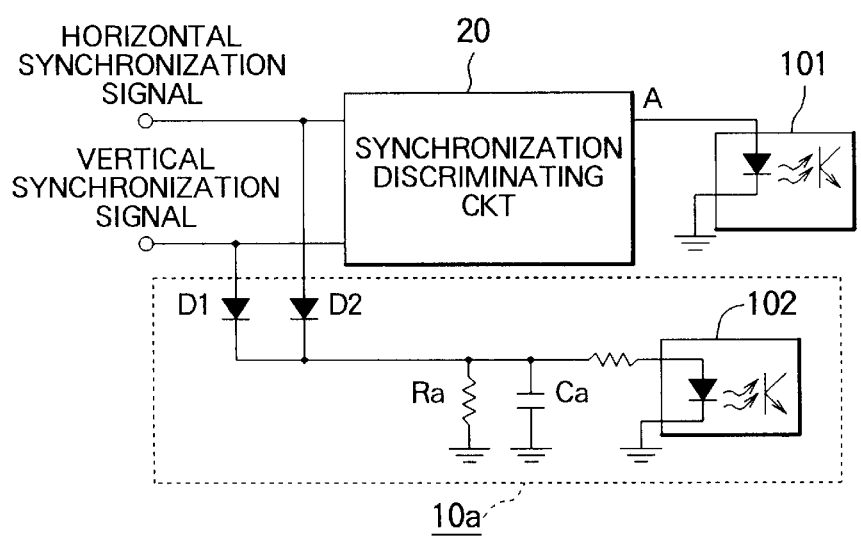
FIG. 4 is a block diagram of a power supply system according to a second embodiment of this invention.

FIG. 4 shows a power supply system according to a second embodiment of this invention is specified by a power control circuit 10a shown in FIG. 4. More specifically, the illustrated power control circuit 10a serves to supply the electric current to the light emitting portions of the photocouplers 101 and 102 in FIG. 1. In addition, the power supply system is used in combination with a CRT display unit of a computer which produces a horizontal synchronization signal and a vertical synchronization signal. To this end, a synchronization discriminating circuit 20 is included in the power supply system to detect the presence or absence of the horizontal and the vertical synchronization signals having an output terminal A connected to an anode of the light emitting portion of the photocoupler 101. The power control circuit 10a comprises diodes D1 and D2, a condenser Ca, and the light emitting portion of the photocoupler 102.

In the normal mode, the synchronization discriminating circuit 20 is supplied with the horizontal synchronization signal and the vertical synchronization signal from the computer. The synchronization discriminating circuit detects an absence of the horizontal synchronization signal and/or the vertical synchronization signal and generates an electric voltage at the output terminal A. When the output terminal A is supplied with the electric voltage, the electric current I1 illustrated in FIG. 2 flows to the light emitting portion of the photocoupler 101. As a result, power source supply to the CRT display unit is interrupted.

On the other hand, when the horizontal and the vertical synchronization signals are produced again from the computer, the horizontal and the vertical synchronization signals are supplied through the diodes D1 and D2 to the condenser Ca to charge the condenser Ca. When the condenser Ca is charged to a voltage level greater than that between a cathode and an anode of the light emitting portion of the photocoupler 102, the current I2 illustrated in FIG. 3 flows to the light emitting portion of the photocoupler 102. As a consequence, the light receiving portion of the photocoupler 102 is turned into a conductive state to restart power source supply to the CRT display unit.

In the illustrated embodiment, description has been made as regards the case where presence or absence of the horizontal and the vertical synchronization signals is discriminated by the synchronization discriminating circuit 20.

Alternatively, presence or absence of either one of the horizontal and the vertical synchronization signals is selectively discriminated and the power control circuit 10a may be re-energized by the selected synchronization signal.

Figure 5:
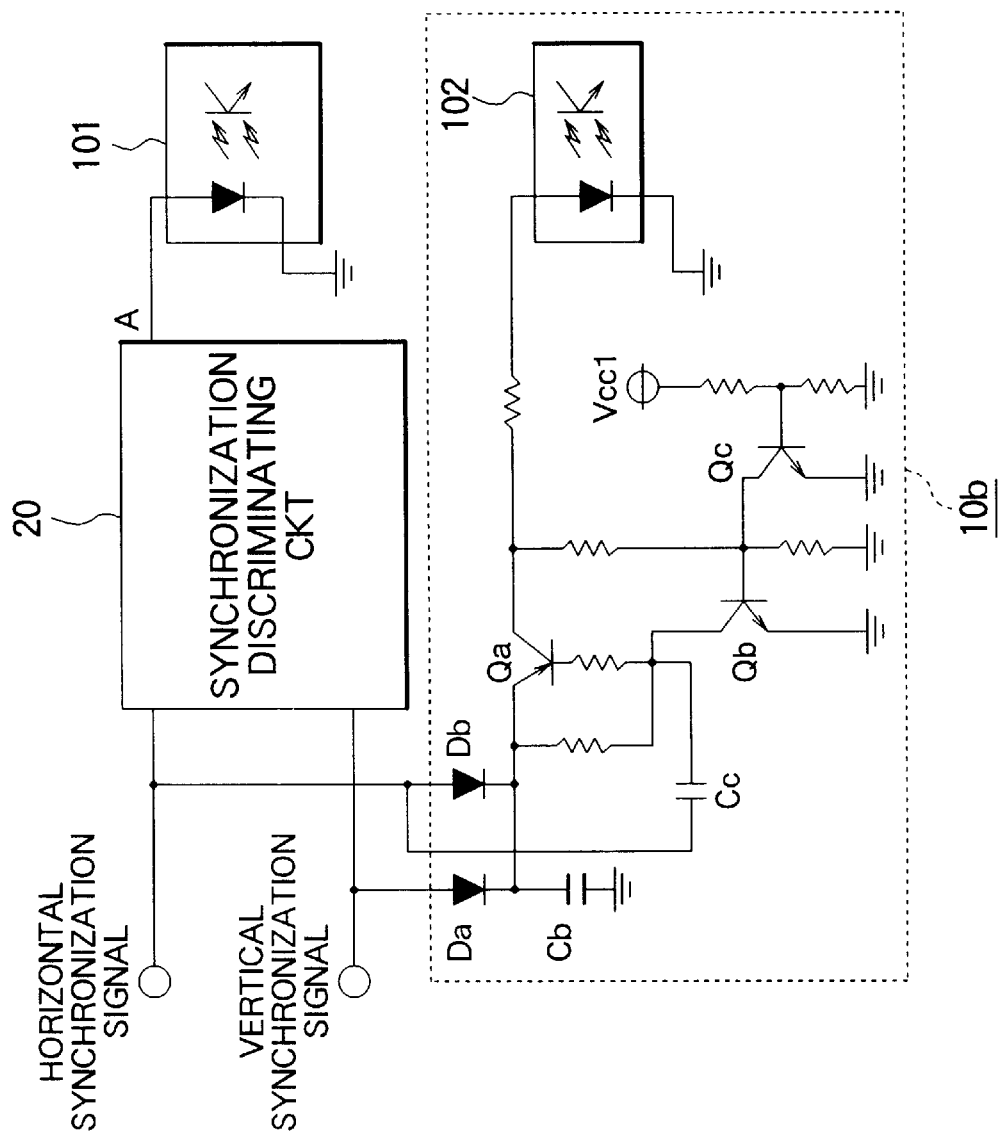
FIG. 5 is a block diagram of a power supply system according to a third embodiment of this invention.

Referring to FIG. 5, a power supply system according to a third embodiment of this invention comprises a synchronization discriminating circuit 20 like in FIG. 4 and a power control circuit 10b. In the illustrated example also, the photocouplers 101 and 102 can be used in those of FIG. 1 and the power supply system of FIG. 5 can be therefore combined with the circuits 10 and 11 shown in FIG. 1. The power control circuit lob has a structure different from that illustrated in FIG. 4 and is adapted to the case where the input signal of a pulse shape is interrupted with a maintained high level. In FIG. 5, when the horizontal and the vertical synchronization signals are no longer received, the electric voltage is produced at the output terminal A of the synchronization discriminating circuit 20. The electric current I1 illustrated in FIG. 2 flows to the light emitting portion of the photocoupler 101 and power source supply to the CRT display unit is interrupted.

The illustrated power control circuit 10b comprises two diodes Da and Db, condensers Cb and Cc, and transistors Qa, Qb, and Qc. When the horizontal and the vertical synchronization signals are supplied again, the photocoupler 102 is brought into a conductive state.

More specifically, the horizontal and the vertical synchronization signals are supplied through the diodes Da and Db to the condenser Cb to charge the same. On the other hand, the horizontal synchronization signal is directly supplied to the condenser Cc also. As a consequence, the transistor Qa and the transistor Qb become conductive at a trailing edge of the horizontal synchronization signal and this conductive state is maintained. Simultaneously, the electric current from the transistor Qa is supplied also to the photocoupler 102 to bring the light receiving portion of the photocoupler 102 into a conductive state to provide the electric current I2 illustrated in FIG. 3.

As a consequence, power source supply to the CRT display unit is restarted. A source voltage Vcc1 is supplied from a power source circuit of the CRT display unit. Following restart of power source supply, the transistor Qc becomes conductive. The resultant transistors Qa and Qb are put into an off state to be recovered to an original state. Thus, the circuit illustrated in FIG. 5 can perform the operation similar to the other embodiments.

Figure 6:
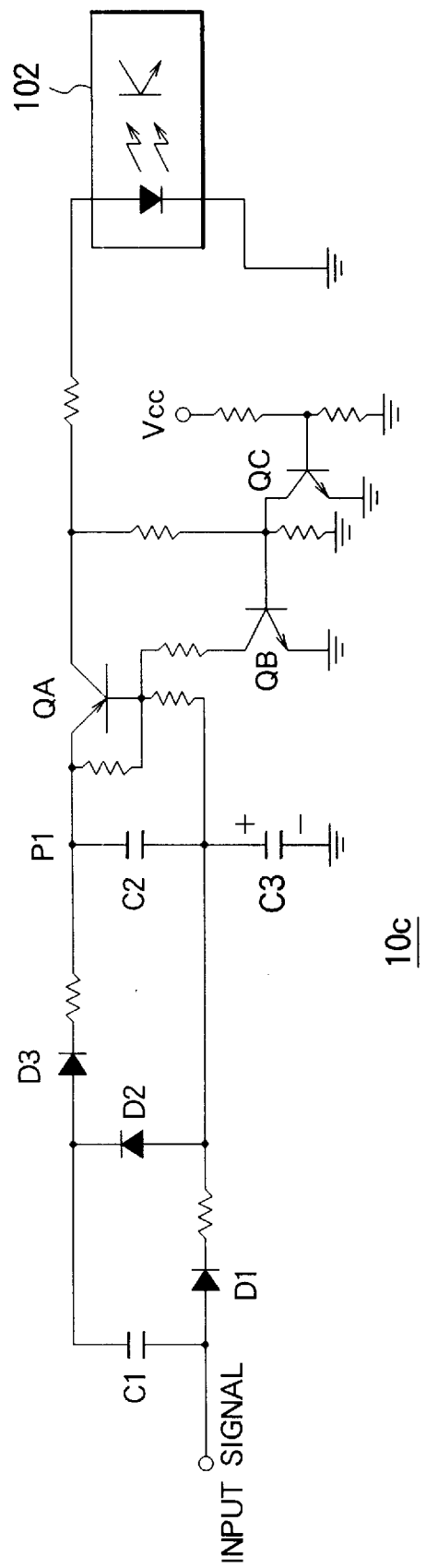
FIG. 6 is a block diagram of a part of a power supply system according to a fourth embodiment of this invention.

Referring to FIG. 6, a power supply system according to a fourth embodiment of this invention is specified by a power control circuit 10c which serves to drive the photocoupler 102 illustrated in FIG. 1. The power control circuit 10c is adapted to the case where the input signal, such as the horizontal synchronization signal and the vertical synchronization signal, is a pulse signal interrupted at a high level and has a low peak-to-peak value. The remaining portion of the power control circuit 10c except the illustrated portion is similar to those of FIGS. 4 and 5 and therefore omitted from FIG. 6 for simplicity of illustration.

The power control circuit illustrated in FIG. 6 comprises condensers C1, C2, and C3, diodes D1, D2, and D3, two transistors QA and QB operable as a thyristor, a resistor, and a transistor QC. The output side of the power control circuit is connected to the light emitting portion of the photocoupler 102. The light receiving portion and the remaining portion following the light receiving portion are similar in structure to those illustrated in FIG. 1.

In the circuit structure illustrated in the figure, the input signal is supplied to the condenser C3 through the diode D1 and is rectified to keep a peak value. On the other hand, the input signal passes through the condenser C1 and is supplied through the diode D3 to the condenser C2 having one end connected to the condenser C3 to be subjected to peak rectification by the condenser C2. In the illustrated circuit, the diode D2 is connected to a common connection point between the condenser C1 and the diode D3. The input signal passing through the condenser C1 is clamped by the diode D2 with reference to a plus side of the condenser C3. Accordingly, a potential at the other end (depicted at P1) of the condenser C2 is approximately twice as large as a peak value of the input signal. When the condenser C2 is charged and the voltage of the condenser C2 becomes higher than a level sufficient to render the transistor QA conductive, the transistor QA is put into a conductive state and a self-holding state is kept by the transistor QB. At this time, the electric charge stored in the condensers C2 and C3 is delivered to the photocoupler 102 to flow the electric current I2 illustrated in FIG. 3. Thus, power source supply to the CRT display unit is restarted.

Figure 7:
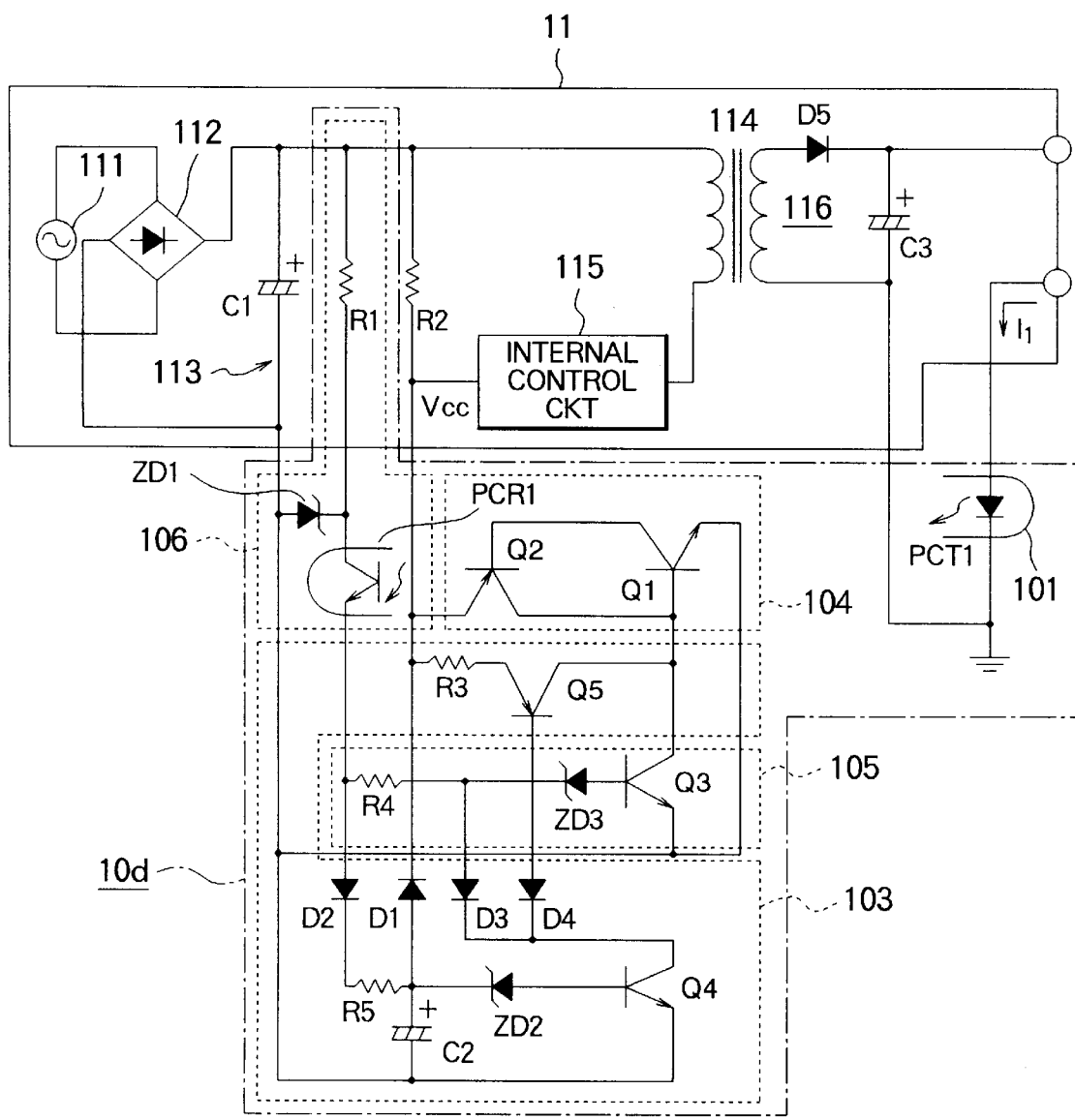
FIG. 7 is a block diagram of a power supply system according to a fifth embodiment of this invention.

Referring to FIG. 7, a power supply system according to a fifth embodiment of this invention comprises a power source control circuit 11 similar to that in FIG. 1, and a power control circuit 10d composed of the off signal transmitting circuit 103 and the reset circuit 105 both of which are slightly different in structure from those illustrated in FIG. 1 and the off state holding circuit 104 similar in structure to that in FIG. 1.

In this embodiment, the operation similar to FIG. 1 can be carried out by the use of the single photocoupler 101. For this purpose, the illustrated system comprises a common circuit 106 for using the light receiving portion PCR1 corresponding to the light emitting portion PCT1 of the photocoupler 101 in common by the off signal transmitting circuit 103 and the reset circuit 105. As illustrated in the figure, the common circuit 106 comprises the resistor R1 connected to the collector of the light receiving portion PCR1. The collector is connected to the Zener diode ZD1 having one end connected to the condenser C1.

The emitter of the light receiving portion PCR1 is connected to the off signal transmitting circuit 103 and the reset circuit 105.

The illustrated reset circuit 105 comprises the NPN transistor Q3. The base of the transistor Q3 is connected to the light receiving portion PCR1 through the resistor R4 and a Zener diode ZD3. The emitter and the collector are connected to the condenser C1 and the base of the transistor Q1, respectively. On the other hand, the off signal transmitting circuit 103 comprises an NPN transistor Q4 and a PNP transistor Q5. The transistor Q4 has a base connected to a Zener diode ZD2. The condenser C2 is connected between a cathode of the Zener diode ZD2 and an emitter of the transistor Q4. The emitter of the transistor Q4 is also connected to the condenser C1. A collector of the transistor Q4 is connected through the diode D3 to a common connection point between the Zener diode ZD3 and the resistor R4 of the reset circuit 105 and is connected through a diode D4 to the base of the transistor QS.

A common connection point between the Zener diode ZD2 and the condenser C2 is connected through a resistor R5 and the diode D2 to the emitter of the light receiving portion PCR1 on one hand and is connected through the diode D1 to the resistor R2 on the other hand.

Figure 8:
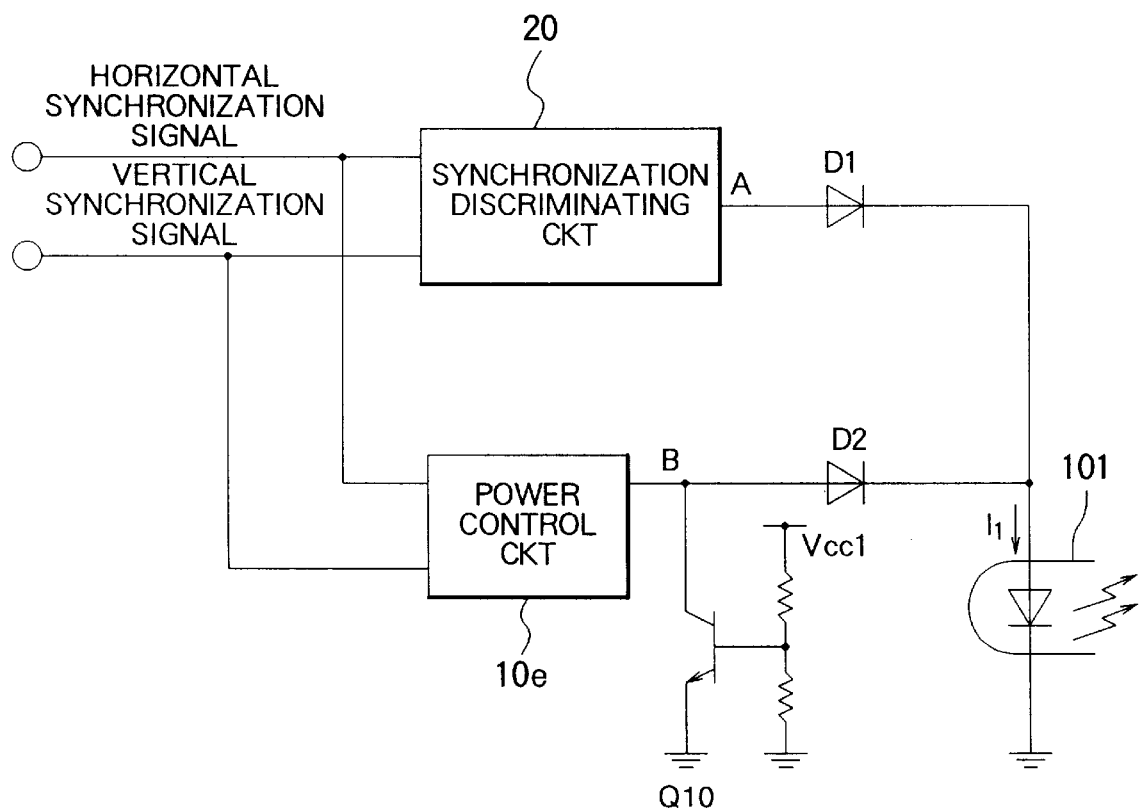
FIG. 8 is a block diagram of a drive circuit for driving the power supply system illustrated in FIG. 7.

Description will be made about the operation of the power control circuit 10d and the source control circuit 11 both of which are illustrated in FIG. 7 and which may be used in combination with a circuit which is illustrated in FIG. 8 and which drives the photocoupler 101, as will become clear.

In the normal mode, the power control circuit 10d is inactive because the electric current I1 does not flow to the light emitting portion PCT1 of the photocoupler 101. In this state, when the synchronization signal produced from the computer is assumed to be stopped, the electric current I1 shown in FIG. 2 flows to the light emitting portion PCT1 of the photocoupler 101. The electric current flows to the light receiving portion PCR1 through the resistor R1. As a consequence, the electric current flows through the resistor R4 to the base of the transistor Q3 to bring the transistor Q3 into a conductive state.

Simultaneously, the electric current flows to the condenser C2 through the diode D2 and the resistor R5. When a voltage across the condenser C2 exceeds a sum of a Zener voltage of the Zener diode ZD2 and a base-emitter voltage of the transistor Q4, the transistor Q4 is also turned into a conductive state. When the transistor Q4 becomes conductive, the transistor Q3 connected through the diode D3 to the transistor Q4 is turned into an interrupted state. On the other hand, the transistor Q4 connected through the diode D4 is put into a conductive state. When the transistors Q4 and Q5 are turned into a conductive state as described above, the electric current flows to the base of the transistor Q1 through the resistors R2 and R3 and the transistor Q5 to bring the transistors Q1 and Q2 into a conductive state. As a consequence, the source voltage Vcc of the internal control circuit 115 has a low level to put the source control circuit 11 into a stop mode, namely, an off mode. This off mode is maintained by the electric current flowing through the resistor R2 to the transistors Q1 and Q2.

On the other hand, when the synchronization signal is produced from the computer, the circuit illustrated in FIG. 8 produces the short pulse current I2 flowing to the light emitting portion PCT1 of the photocoupler 101 as illustrated in FIG. 3. The electric cur rent flows through the resistor R1 to the light receiving portion PCR1 of the photocoupler 101. As a consequence, the electric current flows to the base of the transistor Q3 through the resistor R4 and the Zener diode ZD3. The transistor Q3 becomes conductive while the transistors Q1 and Q2 are turned into an interrupted state.

At this time, the transistors Q1 and Q2 are not turned into a conductive state because the transistor Q4 does not become conductive by a pulse current which lasts for a period shorter than a time constant of a time constant circuit composed of the resistor R5, the condenser C2, and the Zener diode ZD2. As a consequence, the source voltage Vcc of the internal control circuit 115 has a high level and the source control circuit 11 starts its operation to be turned into a normal mode.

Referring to FIG. 8, a drive circuit for driving the power supply system is connected to the light emitting portion of the photocoupler 101 in FIG. 7 and is operable to cause a current I1 to flow through the light emitting portion of the photocoupler 101. The illustrated circuit comprises the synchronization detecting circuit 20 having a function similar to those illustrated in FIGS. 4, 5, and 6, a power control circuit 10e, the diodes D1 and D2, the transistor Q1, and the light emitting portion of the photocoupler 101. The source voltage Vcc1 is supplied from the power source of the CRT display unit.

When no synchronization signal is produced from the computer, the output terminal A of the synchronization discriminating circuit 20 has a high level. The electric current I2 shown in FIG. 2 is given through the diode D1 to the light emitting portion of the photocoupler 101 to interrupt power source supply to the CRT display unit.

When the synchronization signal is supplied again, the electric current I2 illustrated in FIG. 3 is given from an output terminal B of the power control circuit 10e through the diode D2 to restart power source supply to the CRT display unit. Herein, a transistor Q10 is a circuit for preventing an operation error such as interruption of power source supply in the normal mode.

According to this invention, the power control circuit comprises the holding circuit which is kept in a self-holding state during interruption of the input signal to be put in a standby state for the input signal and which is released from the self-holding state when the input signal is received again. It is therefore possible to reduce power consumption during the standby state for the input signal.

As described above, according to this invention, power consumption of the power source circuit for the peripheral unit of the computer during the off mode is no more than the electric power required to keep the self-holding state of the transistors. It is noted here that, in prior art, the electric power on the order of 8 watts is essential even in the off state of the power source circuit. In this invention, the electric power is reduced down to 5 watts or so. In the foregoing embodiments, the description has been made as regards the source control circuit for controlling the power source circuit of the CRT display unit. However, this invention is also applicable to the source control circuit for controlling the power source circuit of a printer unit or any other unit which is put into operation in response to the input signal.

What is claimed is:

1. A power control circuit connected between a signal source for producing an input signal and an operating circuit for carrying out a predetermined operation to put said operating circuit into a active state in response to arrival of said input signal and in an inactive state in response to interruption of said input signal, said power control circuit comprising:

a detecting circuit for detecting the arrival and the interruption of said input signal; and a holding circuit which puts said operating circuit into the active state on the arrival of said input signal and which maintains itself in a self-holding state during the interruption of said input signal while putting said operating circuit into the inactive state, wherein said detecting circuit comprises:

an isolation element which is put into an on state in response to the arrival of said input signal;

said holding circuit comprising:

a thyristor circuit which is brought into said self-holding state in the on state of said isolation element.

2. A power control circuit as claimed in claim 1 wherein said isolation element is a photocoupler.

* * * * *

UNITED STATES PATENT AND TRADEMARK OFFICE
CERTIFICATE OF CORRECTION

PATENT NO. : 5,936,620
DATED : August 10, 1999
INVENTOR(S) : Seiji KOMINE and Hiroshi KATO It is certified that error appears in the above-identified patent and that said Letters Patent is hereby corrected as shown below:

Column 2,　　line 12,　　delete "Ocircuit" and insert --circuit--.

Column 5,　　line 35,　　delete "1ob" and insert --10b--.

Column 7,　　line 62,　　delete "cur rent" and insert --current--.

Signed and Sealed this

Twenty-eighth Day of March, 2000

Attest:

Q. TODD DICKINSON

Attesting Officer　　　Commissioner of Patents and Trademarks